United States Patent
Barandun

(10) Patent No.: US 6,186,391 B1
(45) Date of Patent: Feb. 13, 2001

(54) WELDING ASSEMBLY APPARATUS FOR WELDING FASTENERS TO A COMPONENT AND METHOD OF WELDING FASTENERS TO THE COMPONENT

(75) Inventor: Heinz Peter Barandun, Zurich (CH)

(73) Assignee: Splitfast Technologies Limited, Dublin (IE)

( * ) Notice: Under 35 U.S.C. 154(b), the term of this patent shall be extended for 0 days.

(21) Appl. No.: 09/170,207

(22) Filed: Oct. 13, 1998

Related U.S. Application Data

(62) Division of application No. 08/379,446, filed as application No. PCT/EP93/01922 on Jul. 27, 1993, now Pat. No. 5,820,323.

(30) Foreign Application Priority Data

| Jul. 30, 1992 | (DE) | 42 25 199 |
| Jul. 30, 1992 | (DE) | 42 25 215 |
| Jul. 30, 1992 | (DE) | 42 25 216 |
| Jan. 5, 1993 | (DE) | 43 00 120 |
| Jan. 5, 1993 | (DE) | 43 00 121 |

(51) Int. Cl.[7] .......................... B23K 37/047; B23Q 3/06
(52) U.S. Cl. .................. 228/212; 228/44.3; 269/287
(58) Field of Search .................. 228/212, 44.3; 269/287

(56) References Cited

U.S. PATENT DOCUMENTS

| 1,354,549 | 10/1920 | Gilmer . |
| 1,850,713 | 3/1932 | Fox ................................. 411/516 X |
| 2,240,425 | 4/1941 | Sternbergh .......................... 411/433 |
| 2,582,580 | 1/1952 | Bedford, Jr. ......................... 411/520 |
| 2,737,843 | 3/1956 | Koehl ................................. 411/479 |
| 2,972,275 | 2/1961 | Baubles ............................... 411/479 |
| 3,027,609 | 4/1962 | Parkin et al. .................... 411/526 X |
| 3,217,584 | 11/1965 | Amesbury ............................ 411/508 |
| 3,352,191 | 11/1967 | Crawford . |
| 3,680,272 | 8/1972 | Meyer ............................. 411/508 X |
| 3,996,446 | * 12/1976 | Tauern et al. ......................... 219/99 |
| 4,088,003 | * 5/1978 | Schwab ................................. 72/391 |
| 4,806,064 | 2/1989 | Breese ................................ 411/479 |
| 4,922,587 | 5/1990 | Pettit . |
| 5,178,501 | * 1/1993 | Carstairs .............................. 411/55 |
| 5,285,562 | * 2/1994 | Bidefeld ............................... 29/525 |
| 5,862,877 | * 1/1999 | Horton et al. ....................... 180/312 |

FOREIGN PATENT DOCUMENTS

| 870 008 | 12/1978 | (BE) . |
| 887 911 | 12/1971 | (CA) . |
| 227 212 | 5/1943 | (CH) . |
| 623 064 | 12/1935 | (DE) . |
| 832 086 | 2/1952 | (DE) . |
| 848 123 | 9/1952 | (DE) . |
| 1 817 135 | 7/1970 | (DE) . |
| 2 227 384 | 2/1973 | (DE) . |

(List continued on next page.)

Primary Examiner—Patrick Ryan
Assistant Examiner—Jonathan Johns
(74) Attorney, Agent, or Firm—Foley & Lardner

(57) ABSTRACT

The fastener, which can be arc-welded to a component, is in the form of a resilient sleeve (1) and has a longitudinal slit (2). In a preferred embodiment both its end faces (3) are identical in construction, in order to simplify previous sorting to ensure accurate positioning in the welding assembly apparatus, and provided with a thread-shaped internal bore (4). The welding assembly apparatus for welding on elongate fasteners is provided with a feed channel and an axially displaceable holder for the fasteners. Instead of a slitted collet chuck, the axially displaceable holder (5) is in the form of a rigid tube in which are retained the fasteners in the form of resilient sleeves (1). The arrangement for attaching an assembly part to the fastener has an assembly part (21) which may be set on the fastener in a frictionally- and positively-engaging manner. The assembly part (21) can have in its bore (27) a projection (28) for engaging behind holder (23) mounted on the external wall of the fastener (20).

12 Claims, 10 Drawing Sheets

FOREIGN PATENT DOCUMENTS

| | | |
|---|---|---|
| 2 532 311 | 2/1977 | (DE) . |
| 7 925 469 | 12/1979 | (DE) . |
| 3 218 886 | 11/1983 | (DE) . |
| 0 406 459 | 1/1991 | (EP) . |
| 1 275 799 | 5/1972 | (GB) . |

* cited by examiner

WELDING ASSEMBLY APPARATUS FOR WELDING FASTENERS TO A COMPONENT AND METHOD OF WELDING FASTENERS TO THE COMPONENT

This application is divisional of application Ser. No. 08/379,446, filed Jun. 30, 1995, which is the National Phase of PCT/EP93/01922, filed on Jul. 27, 1993, now U.S. Pat. No. 5,820,323.

The present invention relates to a fastener, which is weldable by arc welding at one of its end faces to a component, and has at least one longitudinal slit; the invention further relates to welding equipment for its welding on, and to an arrangement for the fastening of its assembly part to the fastener.

A fastener according to the heading of Patent claim 1 is known from Canadian Patent No. 887, 911, or GB Patent No. 1,275,799, in which a slitted cup is gripped in the interior of its central portion, by means of a bolt under resilient pressure, is pressed on to and welded to a component, whereupon the lateral portions are bent over. Such a method is not suitable for rationalised and above all for reliable production, as is required in the automotive industry.

The same applies to the element according to U.S. Pat. No. 3,996,446, which is in fact resilient in design, but must firstly be taken into its single possible correct position in order to be gripped internally and pressed on during welding.

Further fasteners are known, such as are frequently used in the automotive industry, in order to fasten, for example, car body components or electrical cables or the like. A common factor in all these previously-known weld-on fasteners is that they are manufactured as solid studs, which as a rule have a flange by means of which they are welded to the sheet metal, for example according to DE-A-32 18 886 or DE-U-79 25 469. Such a solid stud requires a flexible collet on a stud welding equipment. It is apparent from the drawings of the German publication that the gripping with the collet of the stud welding equipment, due to the rigid design of the stud, and in particular also by the flange with wider diameter, requires the use of expensive mechanical parts, which must operate reliably even at high operating frequencies.

A cylindrical welding stud is known from DE-A-25 32 311, having no flange, yet which does not substantially simplify the collet chuck of the stud welding equipment.

Moreover, problems arise due to the design of the previously-known studs relating to uniform weld quality of the fusion between the sheet metal part and the stud, for which special measures are necessary for the design of the welding surfaces of the stud. This applies also for the fasteners according to DE-B-2 227 384, in which either the threaded studs or the nuts must be welded on as fasteners. Both these illustrated fasteners cause high demands on the collet of the stud welding equipment, which must be specially designed for this purpose.

Moreover, when there is fatigue in the collet, electrical contact with the stud can no longer be guaranteed, which leads to scorched areas, reducing reliability, which is essential in assembly lines.

Finally, the previously known weld studs or fasteners have a defined welding surface, which must be accurately positioned in the welding equipment. This complicates the feeding, as these elements must be fed into the welding equipment pre-sorted.

Using this prior art as a starting point, one purpose of the present invention is to propose a weld-on fastener which on the one hand guarantees reliable welding on to a support and, even in its simplest embodiment, offers the possibility of fastening a variety of assembly parts thereon, while on the other hand simplifying the retaining portion of the welding equipment and its feeding system, ensuring an optimal flow of current between the collet and the fastener. Such a fastener is described in claim 1.

With such a fastener, on the one hand the said fastener needs not be pre-sorted and accurately positioned in order to be fed into the rigid holder, and on the other hand the resilient force or push-on force is so high because of the formation of the longitudinal slit on the current-transferring holder, that an optimum transmission of current from the holder to the fastener is always ensured.

Whereas in one embodiment the conical funnels on both end faces of the fastener have a threaded shape, the fastener may also be provided with an external thread or with retaining claws. A common feature of all features is however that they are resilient in design, in order to ensure the flexibility necessary for the fastening technology, and guarantee good current conduct.

The previously-known studs for example are welded on with a welding equipment according to DE-A-32 18 886 or DE-U-79 25 469. Such a solid stud requires a flexible collet on the welding equipment. It is apparent from the drawings of the Disclosure Document that the holder with the collet of the welding equipment, constrained by the rigid execution of the stud and in particular also by the flange with its wider diameter, must comprise expensive mechanical parts, which must operate reliably even at high operating cycles.

In such welding equipments with known stud holders with a collet made from steel or beryllium copper, at the required flexibility the collet is subject to extreme wear, particularly when the contact and clamping surfaces of the collet bear against sharp thread zones of the stud.

In stud welding according to the drawn arc principle, 3–5000 A are transmitted through the small contact points, which, upon release of the clamping force of the collet, leads to scorched areas. This reduces the reliability, which is essential particularly in assembly lines.

Moreover, problems arise from the formation of the previously-known welding studs in terms of a uniform welding connection between the sheet metal part and the stud, so that special measures for shaping of the welding surfaces are necessary. This applies also to the fasteners according to DE-B-2 227 384, in which either threaded studs or nuts are welded on as fasteners. Both these illustrated fasteners make particularly stringent demands on the collet of the welding equipment, which for this purpose must be specially designed.

There is in addition known from EP-A-406 459 a stud welding gun requiring stud holder tubes with a differing diameters, as well as plastics washer inserts, whereby the retaining tubes being subject to relatively heavy wear.

Finally, the design of the previously-known weld studs with a defined welding surface requires an arrangement for accurately positioned feeding of the weld studs.

Starting from this point, a further purpose of the invention is to propose a welding equipment in which the feeding system and the retaining part for the fastener can be considerably simplified, and ensures an optimum current flow between the retaining part and the fastener during the welding process. A welding equipment fulfilling this purpose is described in claims 14–16.

The welding equipment claimed is characterised in that its holder has, instead of a flexible collet, a rigid tube, in which the fastener, designed as a flexible sleeve, is guided and embraced over a large area. In this way a large number of the movable parts of the welding equipment, which are liable to malfunction, are eliminated.

In known arrangements, the internal wall of the fastening bore of the assembly part which is to be assembled, mostly made from plastic material, usually has webs, which are uniformly distributed as stiff ribs. Assembling such a part on to a solid weldstud, which may be profiled, demands high push-on forces requiring high energy consumption and a stiff design, particularly with semi-automatic and automatic assembly tools.

Assembly parts are also known with locking protections which engage in a profiled portion on the weld stud; in this case, however, only little pull and shear forces are transmitted from the assembly point to the stud.

In the case also of a cylindrical bore in the assembly part, the assembly forces are higher by a multiple than in the assembly part with webs, yet here also contact is only established at points between the stud and the internal wall of the bore of the assembly part.

Starting from this point, a further purpose of the invention is to propose an arrangement for attaching an assembly part to a weld-on fastener which gives rise to considerable simplification of the mounting of the assembly parts, entailing greater reliability and safety of the connection, as well as offering a greater variety of attachment parts. An arrangement fulfilling this purpose is described in the Patent claims.

The invention will be explained in more detail in the following with reference to a drawing illustrating embodiments given by way of example.

Figure 1:
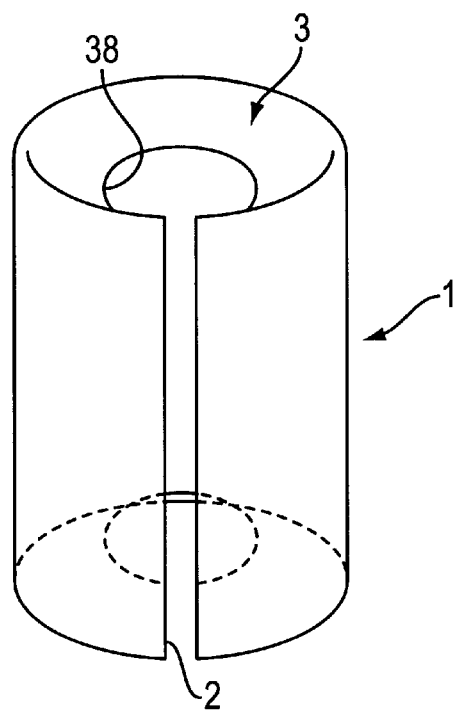
FIG. 1 shows in perspective view a first embodiment of a fastener according to the invention.
Figure 2:
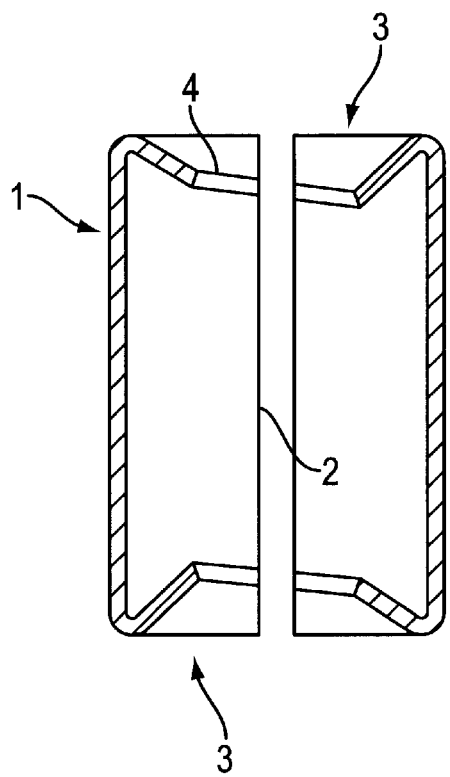
FIG. 2 shows the fastener of FIG. 1 in cross-section.

FIGS. 1 and 2 show a first fastener 1 in the form of a resilient sleeve and having a longitudinal slit 2. As FIG. 2 shows, this fastener is axially symmetrical in design with both end faces 3 in the shape a funnel to the internal side. The end faces however are not radially symmetrical, but so shaped that the internal edges 4 of the end faces have a thread-like profile. Due to the sleeve-shaped slit design of the fastener, it has, if appropriate materials are chosen, a high resilient force which involves a variety of advantages. The assembly parts attachable thereto have as a rule a large degree of dispersion of tolerances, so that the required flexibility by the use of rigid studs must alone be supplied by the plastics or metal components. This has the disadvantage that the forces transmitted through the assembly part are small. The forces which may be transmitted from a flexible fastener to an assembly part are thus considerably greater. Moreover, the weld studs made from solid material are of high weight, which in view of the number of weld studs which may be used in an automobile, comes to an overall weight which is not inconsiderable.

The necessity of welding the entire surface of a solid weld stud leads to a situation in which the large resultant welding surface stands in an unfavourable relationship to the thickness of the sheet metal. Because of this, thin sheet metal undergoes intense heating and heat transmission in the weld area, which leads to weakening of the strength in the edge area of the stud adjoining the sheet metal. These disadvantages are eliminated by the fastener according to FIGS. 1 and 2, as only annular welding zones and similar to identical material thicknesses are present.

As already stated, the symmetrical design of the fastener means that it need only be brought into the feed system in an axially directed manner, and requires no accurate positioning into the correct position. This simplifies the feeder equipment and increases its reliability.

Figure 3:
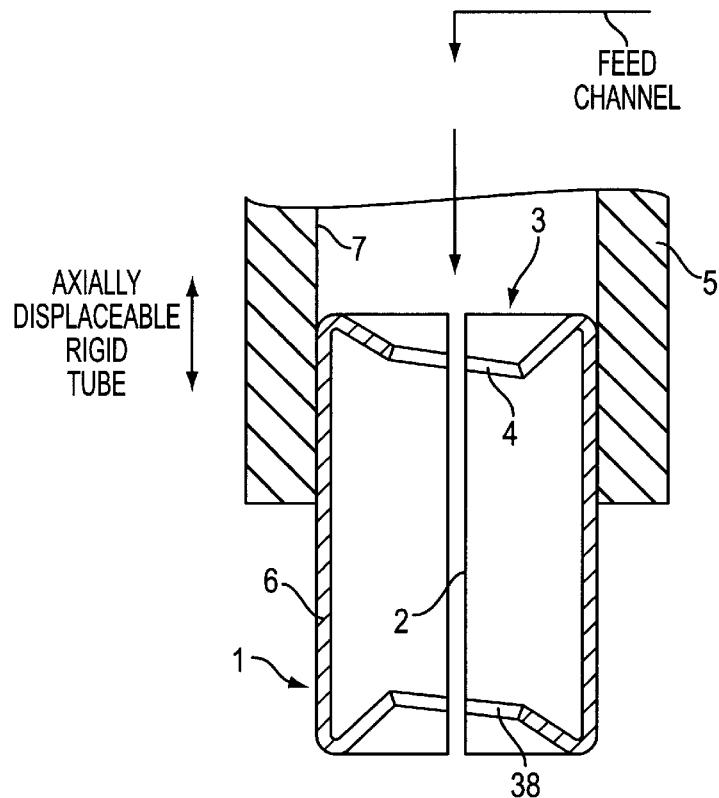
FIG. 3 shows a fastener according to FIG. 1 in a rigid holder of a welding equipment.

As stated, a further important advantage of the resilient sleeve-shaped fastener resides in the fact that the equipment can be substantially simplified. As the fastener is resilient in design, it is sufficient, instead of using a slitted collet with a complicated actuating mechanism, to use a rigid tube as a holder. This gives rise not only to substantial simplification of the welding equipment, but also to a considerable increase in its reliability. In FIG. 3, for example, the fastener 1 according to FIG. 1 is shown in a tube 5. The previously-known and conventional feed procedure for the fastener by means of flexible pipes and compressed air can be retained here, the fastener, as already stated, requiring only to be axially aligned. The welding process as such also remains the same, so that previously-known installations may be used, on which, instead of the complex holders with movable collets, a retaining tube can be used, which is axially displaceable. Naturally the compressed air pulse required to bring the fastener axially into its initial position in the feed tube 5, must be appropriately chosen in terms of size and length. The through opening 38 in the fastener permits a protective gas to be introduced to the point of welding. Both the outer surface 6 of the fastener and the internal surface 7 of the holder are smooth, in order to ensure the smoothest possible axial feeding, and a large-area surface contact for transmission of the welding current, both the material and the diameter of the bore in the fastener playing a part in the design and calculation of the external diameter of the fastener, and of the internal diameter of the tubular retaining means, in order to achieve a corresponding prestress.

Figure 4:
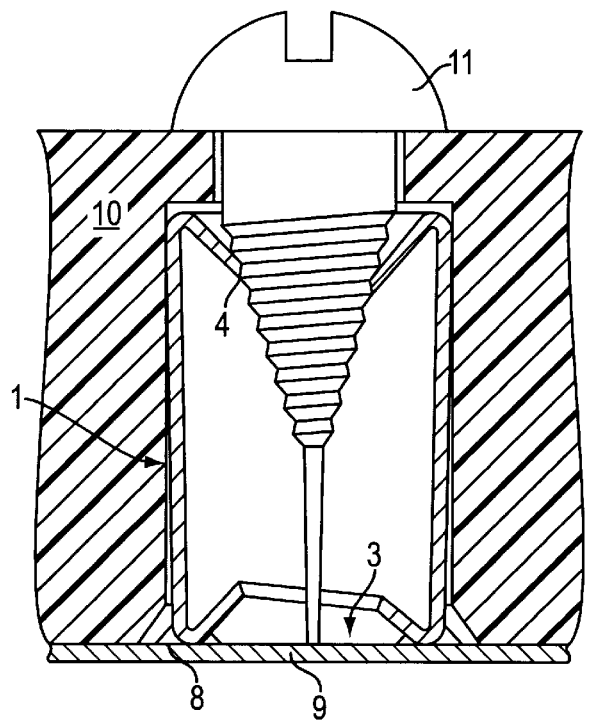
FIG. 4 shows a welded-on fastener according to FIG. 1 with a surrounding assembly part.

FIG. 4 shows the welded-on fastener 1 according to FIG. 1 with the surrounding assembly part 10. The fastener 1 is welded by the welding point 8 to a component 9, for example the sheet metal bodywork of an automobile. The assembly part 10, made for example of plastics material, is secured by a screw 11 which can be screwed directly into the thread 4 of the fastener 1. As the fastener is resilient in its upper zone even after being welded on, when the assembly part is pressed on a clamping action can be achieved in order to provide a secure connection after attachment by means of the screw.

Figure 5:
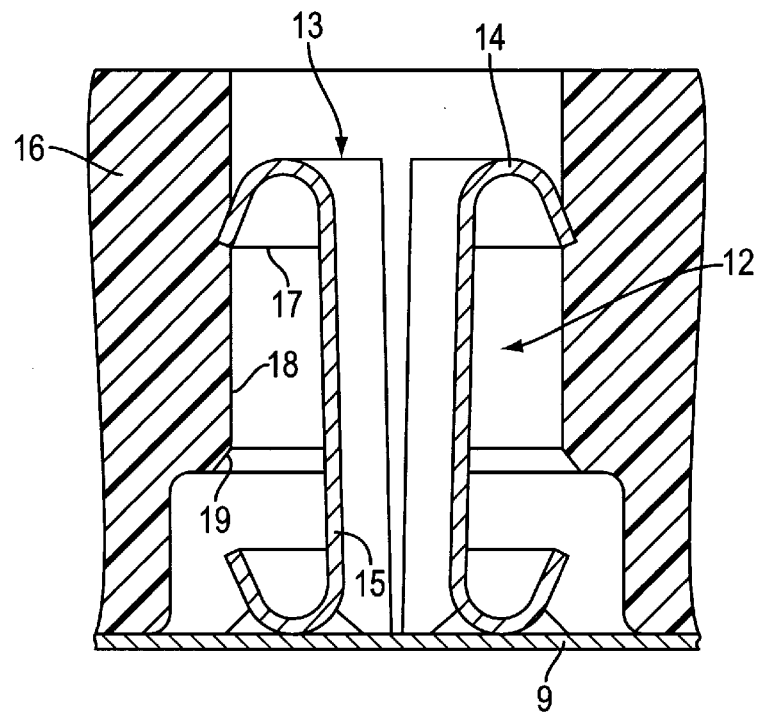
FIG. 5 shows a further welded-on fastener with an assembly part attached thereto.

FIG. 5 shows a further fastener 12, which is likewise resilient and sleeve-shaped in design and has a longitudinal slit, but in which the two end faces 13 have edges 14 which are bent outwards in a 'U' shape. These edges 14, which project out from the cylinder wall 15, can develop a clamping and retaining action. In this case this assembly member 16 appropriately has a bevelled area 19 in its bore 18, in order better to overcome the bent edge 14 of the fastener. Both external sides of the bent-over edge 14 must be such that they provide sufficient contact surface between the fastener and the holder.

Figure 6:
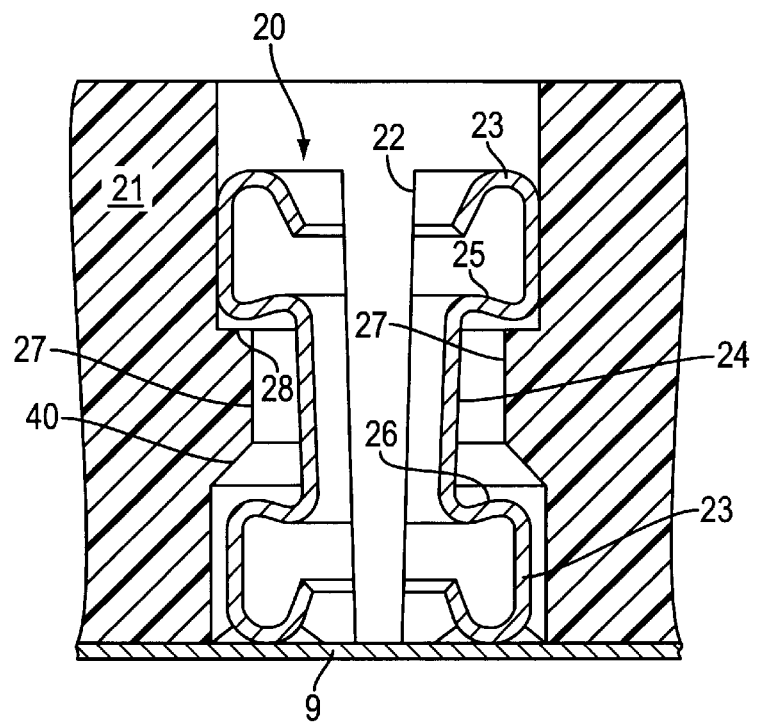
FIG. 6 shows a further welded-on fastener with an assembly part attached thereto.

FIG. 6 shows a further fastener 20, which because of its shape can retain an assembly part 21 by clamping action alone. The fastener 20 has the same end faces 3 and a longitudinal slit 22. The outer surface of the fastener is not even, but has two identical end portions 23 and a central portion 24, which is of smaller diameter than the end portions. This gives rise externally to two projections 25 and 26, one of which, projection 25, serves on the welded-on fastener to retain the assembly part. The assembly part 21 has a collar 26 corresponding to the constricted central portion 24 of the fastener, the upper edge 28 of which, in the drawing, engages behind the projection 25. For purposes of better introduction of the assembly member, the lower edge 40 is bevelled. It can be seen from the drawing that the bevelled edge and the collar compress the upper portion of the fastener upon its introduction, and this upper end portion then expands again in order to hold the assembly member securely.

Figure 7:
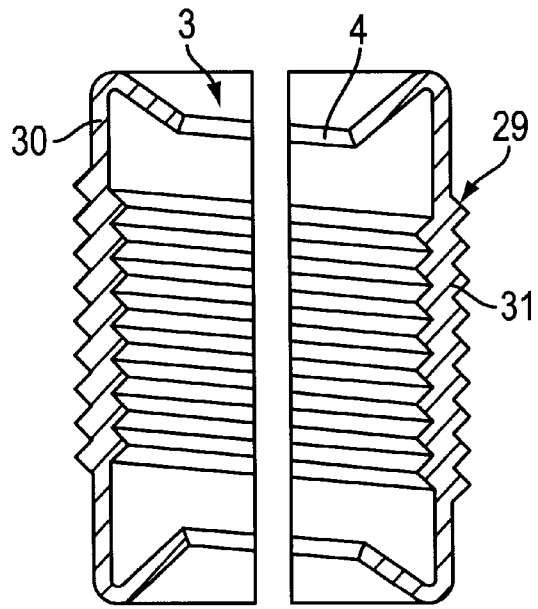
FIG. 7 shows in cross-section a further design variant of a fastener, with external thread.

The fastener 29 according to FIG. 7 has the same end faces 3 as the fastener according to FIG. 1, and also the upper terminal portions 30 are identical with those in that fastener. The central portion 31 however is in the shape of a screw-like thread. It should be noted that the fastener 29 according to FIG. 7 can accommodate either a screw internally and/or a screw or nut externally.

Figure 8:
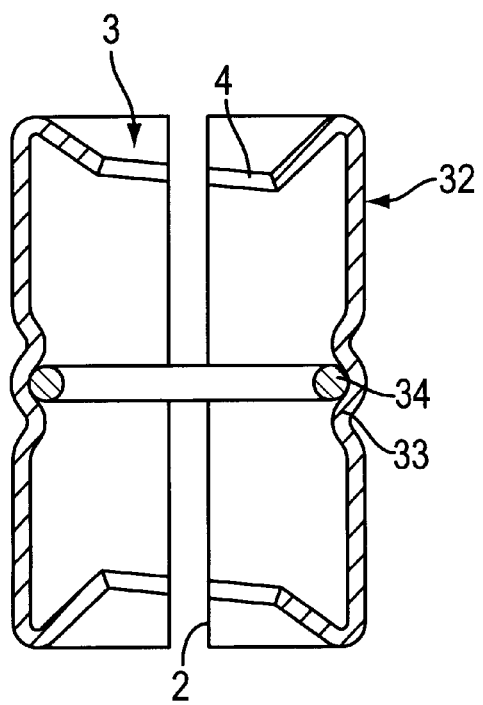
FIG. 8 shows in cross-section a further design variant of a fastener with spring-washer.

The fastener 32 according to FIG. 8 is identical in structure according to FIG. 1 with the exception of its central portion. The central portion 33 of the fastener 32 is S-shaped in order to receive internally a resilient clamp ring 34, the significance for fixing an assembly part being obvious.

Figure 9:
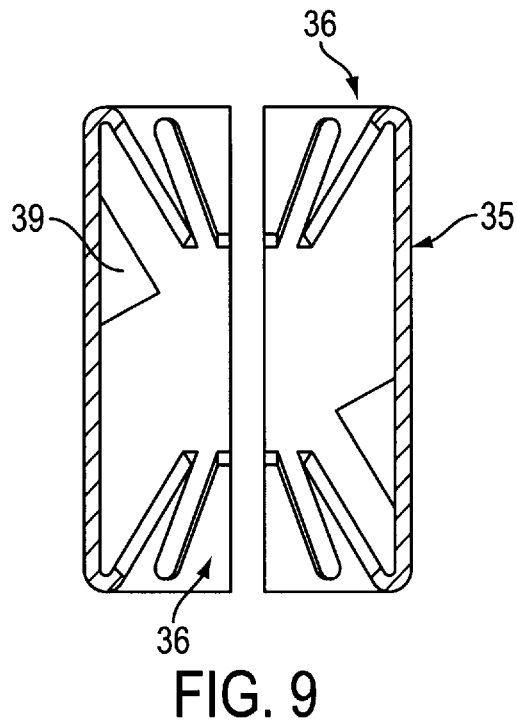
FIG. 9 shows a further embodiment of a fastener with internal retaining claws.

The fastener 35 in FIG. 9 is a further embodiment. Each end face 36 is provided with incisions, so that it is resilient. In this way not only can screws be received in the bore with a thread, but also studs or the like without a thread, which can be retained by the clamping action. This fastener likewise has a slit. In addition, retaining claws 39 are cut out axially from the surface of the fastener, and bent inwards. Depending on whether a stud is introduced from one side or the other into the fastener, one or the other claw 39 engages therein, additionally securing it.

Figure 10:
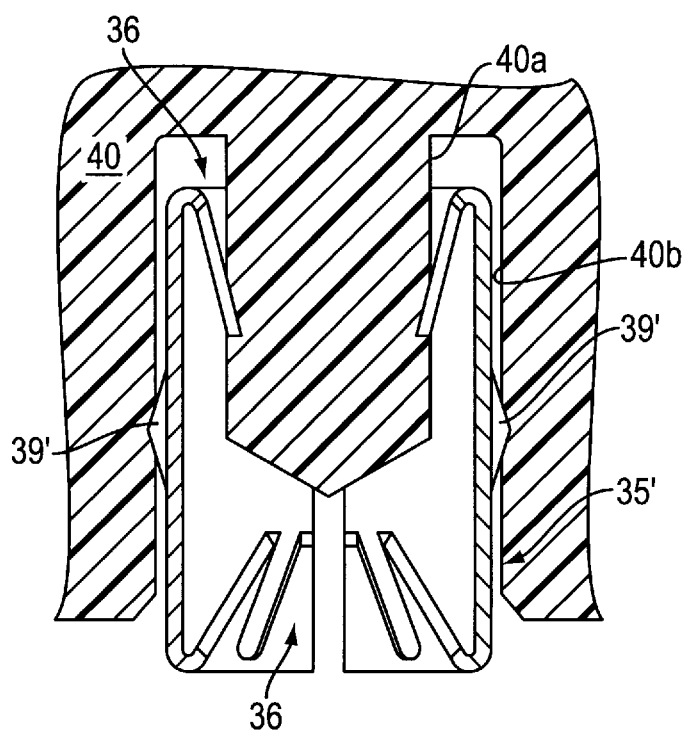
FIG. 10 shows a fastener with external retaining claws, with an assembly part attached thereon.

FIG. 10 shows a fastener 35' similar to that in FIG. 9, yet retaining claws 39' are bent outwards. When an assembly part 40 with a stud 40a is mounted, the claws 39' engage in the bore wall 40b of the fastener and additionally secure it.

Figure 11:
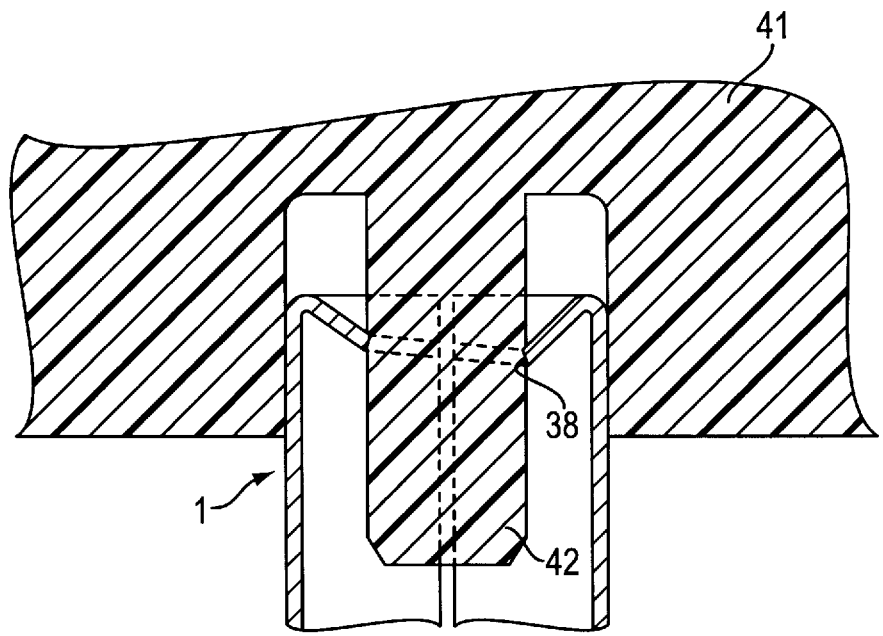
FIG. 11 shows a fastener according to FIG. 1 with an assembly part attached thereon.

FIG. 11 shows that, when an assembly part 41 is used with a stud 42 projecting into the bore 38 of the fastener 1, the retaining force of the bore wall is considerably increased by the fact that the fastener 1 is embraced by the assembly part.

Figure 12:
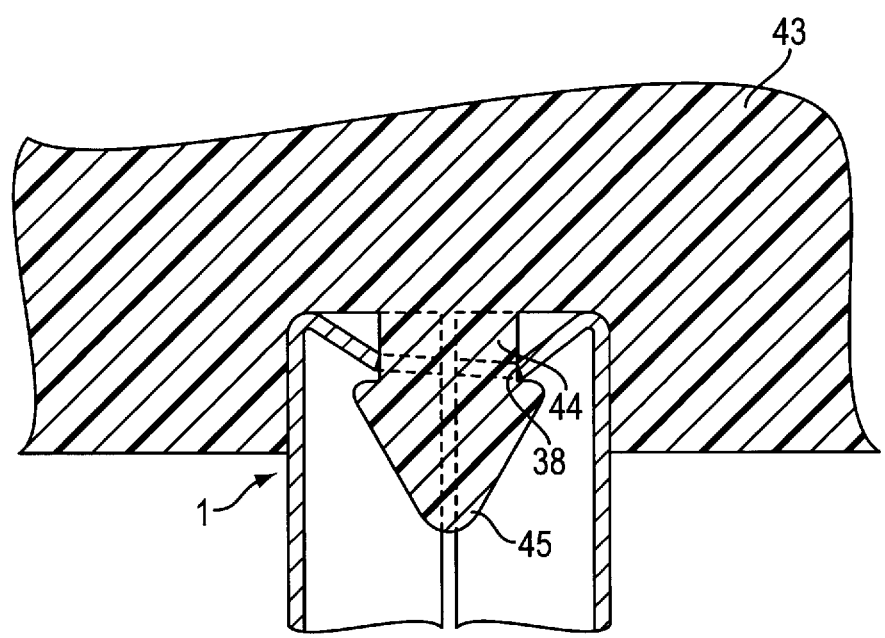
FIG. 12 shows a fastener according to FIG. 1 with an assembly part attached thereon.

FIG. 12 shows a further assembly part 43 with a stud 44 with a positively-engaging barb 45, which has a high retaining capability.

Figure 13:
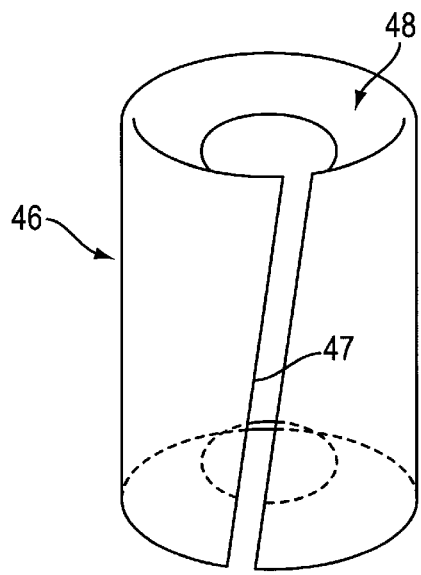
FIG. 13 shows a design variant of the fastener according to FIG. 1.

FIG. 13 shows that the term "longitudinal slit" does not necessarily mean a slit parallel to the longitudinal axis of the fastener. The fastener 46 has a longitudinal slit 47 which is inclined with respect to the longitudinal axis of the element. The other parts of the fastener with end faces 48 are identical with those in the fastener according to FIG. 2.

Figure 14:
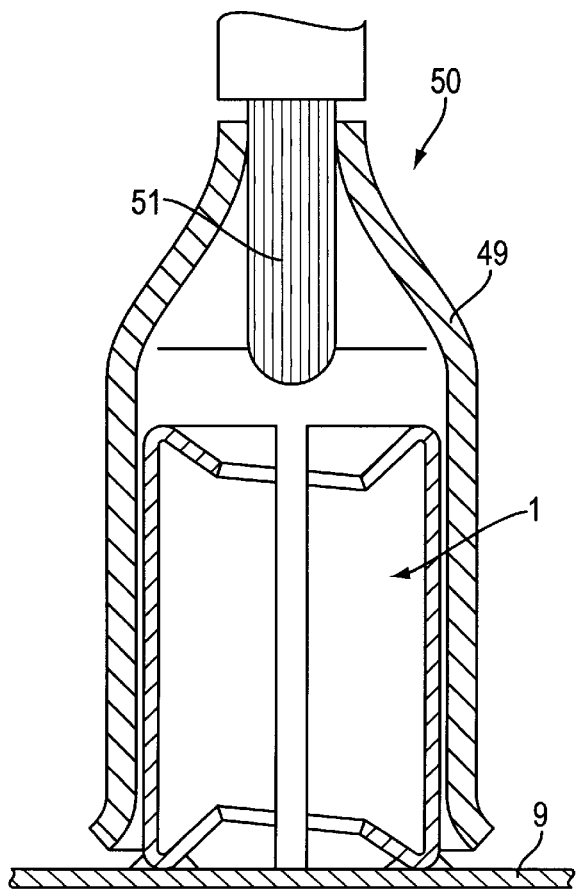
FIG. 14 shows an embodiment of an electrical connector with the fastener according to the invention.

FIG. 14 indicates the possibility of using a fastener according to the invention as an electrical connection; in principle, a fastener according to FIGS. 1 or 13 can be involved. The fastener 1 is welded on to a conductive base 9 and serves as a male plug portion, over which the female contact portion 49 of a correspondingly-shaped cable contact terminal 50 can be pushed, with the contact pin 51. By means of using a cylindrical or approximately cylindrical resilient fastener, automatic and effective connection is possible, which is impossible with flat plugs.

Figure 15:
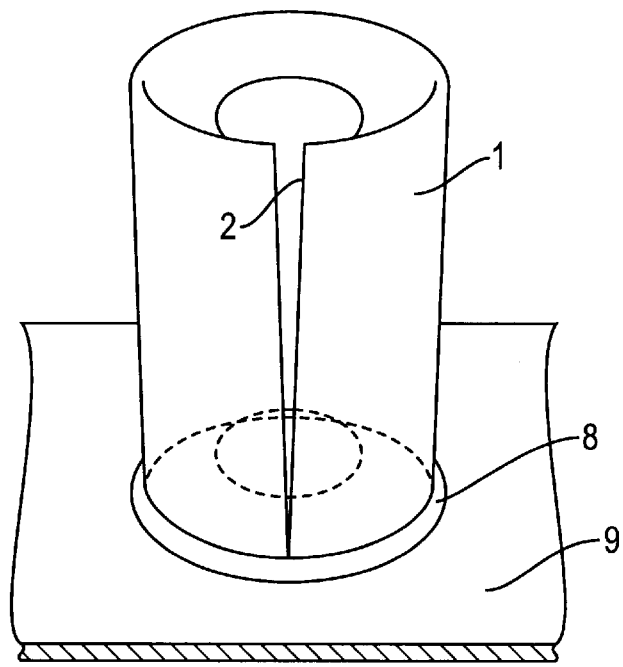
FIG. 15 shows an arrangement for measuring the welding quality.

It is possible, according to FIG. 15, to monitor the mechanical quality of the weld seam 8 on the base 9. As the fastener 1 has a slit 2, and it is welded on in a compressed state, the latter tends to expand again later. If the weld seam is not good, the width of the slit 2 will extend in a different way from that for a good weld seam. It is therefore possible, for example by optical inspection of the configuration of the slit, to come to a conclusion regarding the quality of the weld seam.

Figure 16:
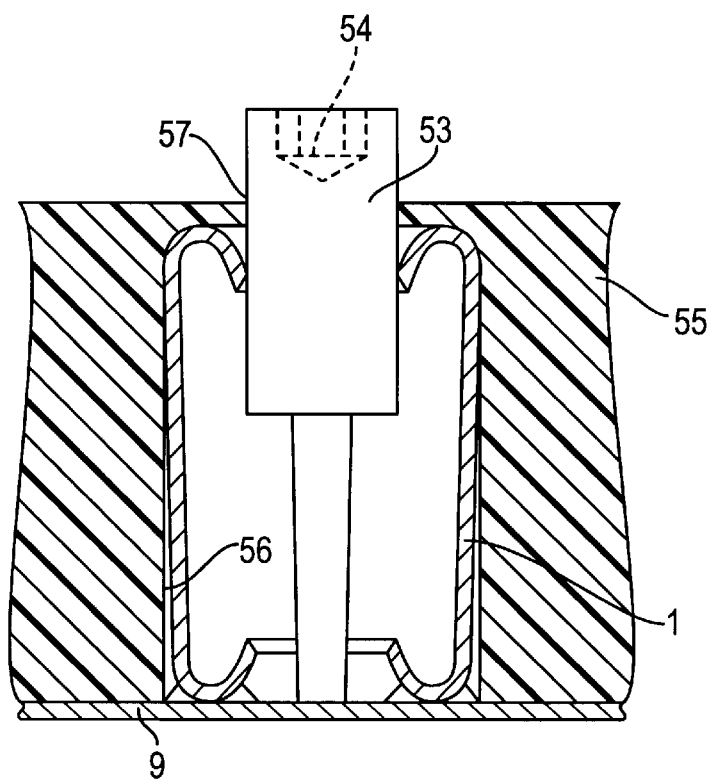
FIG. 16 shows a further type of attachment of an assembly part.
Figure 17:
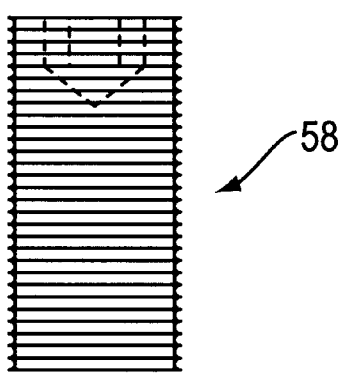
FIGS. 17 and 18 show two design variants of a part according to FIG. 16.
Figure 18:
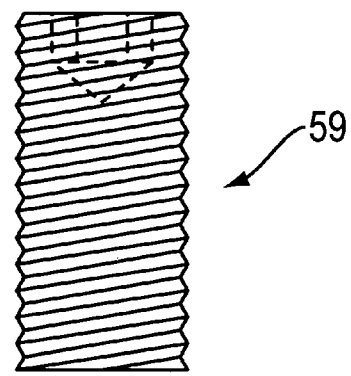

FIG. 16 shows a locking element in the shape of an expansion pin 53, which fits into the opening 38 of a fastener according to FIG. 1, and whose length is less than the smallest distance between the end faces 3 of the fastener. By pushing the pin into the interior of the fastener, the element can be unlocked. In order to provide better handling of the expansion pin, the latter has at least at one end a slit or internal hexagon 54 or the like. By means of this expansion pin, an assembly part 55 with blind hole 56 and smaller opening 57 for the expansion pin can be assembled, locked and unlocked. Instead of an expansion pin 53 with a smooth surface, a pin with a grooved or threaded surface can be used such as pin 58 in FIG. 17 or pin 59 in FIG. 18, respectively, in order to permit either better retention or turning in and out of the pin.

Figure 19:
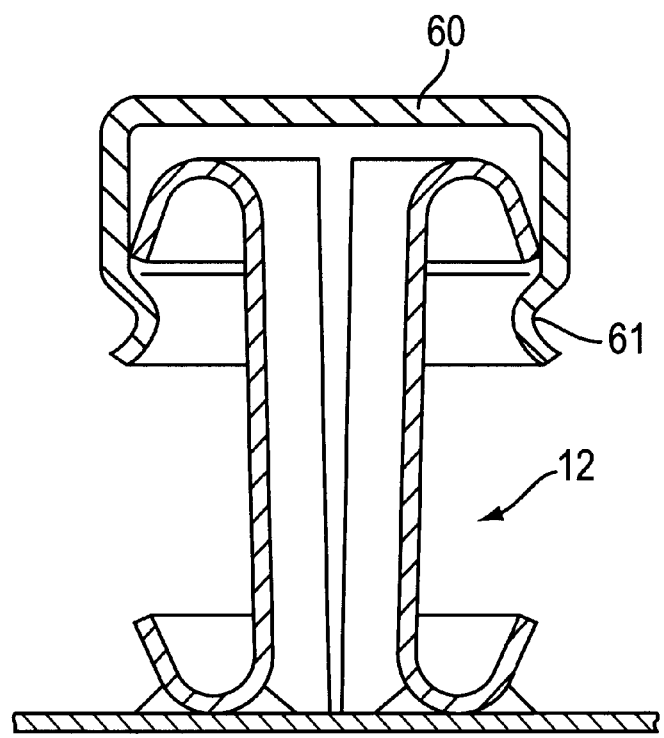
FIG. 19 shows a further assembly part.
Figure 20:
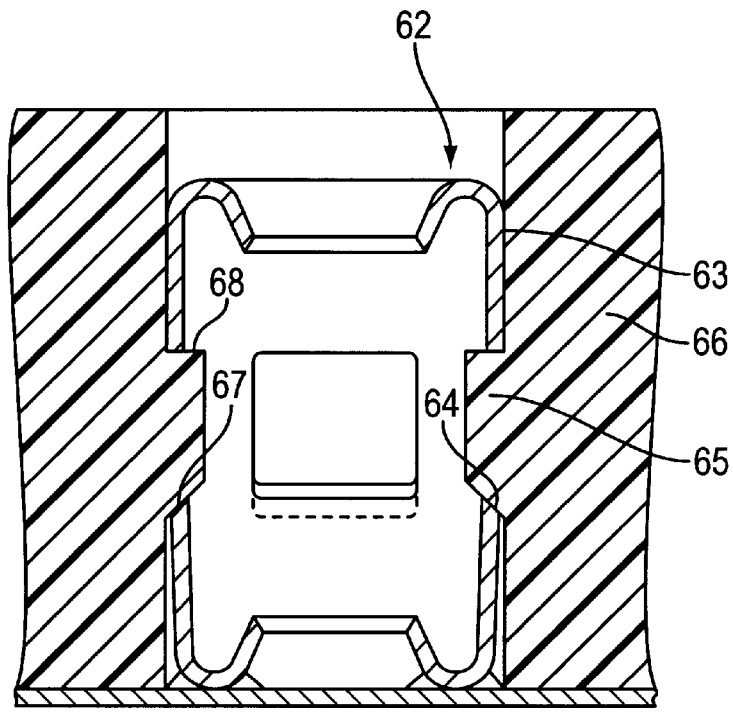
FIG. 20 shows a further design variant of a fastener and an associated assembly part.

FIG. 19 illustrates that the use of a resilient fastener opens the possibility of mounting a rigid component, e.g. a rigid cap 60 with an internal bead 61, on said fastener. The cap part can in itself represent an assembly part, or can be connected to such a part FIG. 20 shows a further embodiment of a fastener. The fastener 62 has in its sleeve wall 63 a window 64, into which grip corresponding projections 65 on the assembly part 66, locking the latter. In order to improve the sliding in and locking, the projections have at their base, towards the support 9, bevels 67, and towards the top a projection 68. For unlocking, openings (not shown) may be provided in the assembly part, into which there fits a correspondingly shaped tool, in order to compress the fastener together.

Figure 21:
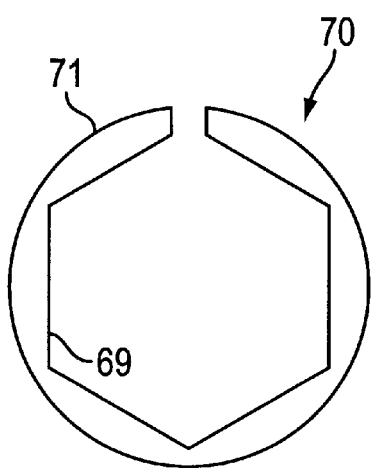
FIG. 21 shows a cross-section through another embodiment of a fastener.

FIG. 21 shows that the internal surface 69 of the sleeve wall of a fastener 70, instead of being cylindrical, can be polygonal, e.g. hexagonal, in order to prevent turning, whereas the external surface 71 at this point is cylindrical. With appropriate adaptation of the welding pistol it is feasible to make the external surface of the sleeve wall polygonal, e.g. hexagonal.

Whereas in the drawings the wall of the longitudinal wall of the fastener is shown as being of uniform thickness, portions thereof, particularly the central portion, can be of lesser thickness than the other portions.

A series of different fasteners have been indicated; these however have not been dealt with exhaustively. Thus from the examples, further possibilities may be combined, the essential features of the fastener, i.e. its design as a sleeve and the resilient property of the sleeve wall, however, appearing in all members. The automotive industry was mentioned as an example of application, yet other fields of application are suitable for this device, in particular apparatus construction.

What is claimed is:

1. A welding assembly apparatus for welding resilient sleeve fasteners onto a component, comprising:

a feed channel; and an axially displaceable holder cooperating with said feed channel at one end and open at the other end, said axially displaceable holder being in the form of a rigid tube into which the resilient sleeve fasteners are guided for welding, said rigid tube being configured to directly contact and completely encircle an exterior surface of a resilient sleeve fastener to be welded, said rigid tube also being configured to electrically communicate with the resilient sleeve fastener to be welded to transmit welding current thereto.

2. A method of operating a welding assembly apparatus to weld resilient sleeve fasteners onto a component, comprising the steps of:

providing a feed channel and an axially displaceable holder cooperating with the feed channel at one end and open at the other ends the axially displaceable holder being in the form of a rigid tube into which the resilient sleeve fasteners are guided for welding;

inserting the resilient sleeve fasteners into the feed channel, without previous sorting to ensure correct positioning; and providing a pulse of compressed air to the feed channel to guide the resilient sleeve fasteners into an initial position in the rigid tube for advancement toward and welding to the component, the rigid tube being configured to directly contact and completely encircle an exterior surface of a resilient sleeve fastener to be welded, said rigid tube also being configured to electrically communicate with the resilient sleeve fastener to be welded to transmit welding current thereto.

3. A welding assembly apparatus according to claim 1 wherein the resilient sleeve fasteners are hollow, and protective gas is led through a center of the resilient sleeve fastener to be welded as far as the point of welding.

4. A welding assembly apparatus according to claim 1, wherein an internal surface of said rigid tube is smooth.

5. A welding assembly apparatus according to claim 1, wherein the resilient sleeve fastener to be welded has a widest portion, and said rigid tube has an inner diameter that is dimensioned relative to that of an outer diameter of the widest portion so as to cause prestressed contact between the resilient sleeve fastener and said rigid tube.

6. A welding assembly according to claim 1, wherein said rigid tube has a cylindrical inner surface.

7. A welding apparatus for welding resilient sleeve fasteners to a welding site, comprising:

a rigid tube for guiding the resilient sleeve fasteners to the welding site, said rigid tube being configured to directly contact and completely encircle an exterior surface of a resilient sleeve fastener to be welded, said rigid tube also being configured to electrically communicate with the resilient sleeve fastener to be welded to transmit welding current thereto.

8. A welding apparatus according to claim 7, wherein said rigid tube is axially displaceable relative to the welding site.

9. A welding apparatus according to claim 7, wherein said rigid tube has a smooth, internal surface.

10. A welding apparatus according to claim 9, wherein said rigid tube is cylindrical and has an internal diameter which is so sized relative to an outer diameter of the resilient sleeve fastener to be welder as to assure frictional engagement and electrical contact therebetween.

11. A method of welding resilient sleeve fasteners at a welding site, comprising the steps of:

inserting the resilient sleeve fasteners into a feed channel;

providing a rigid tube to receive the resilient sleeve fasteners from the feed channel and to frictionally engage and electrically contact the resilient sleeve fasteners; and axially displacing the rigid tube to present a frictionally engaged resilient sleeve fastener to the welding site; and welding the resilient sleeve fastener at the welding site.

12. The method of claim 11, further comprising:

providing a pulse of air to the rigid tube to align in the rigid tube the resilient sleeve fastener to be welded.

* * * * *